Nov. 4, 1952     S. L. ALTON     2,616,665
JACK ENGAGING HUB BRACKET FOR DETACHABLE
AUTOMOBILE DISK WHEELS
Filed July 7, 1950     2 SHEETS—SHEET 1
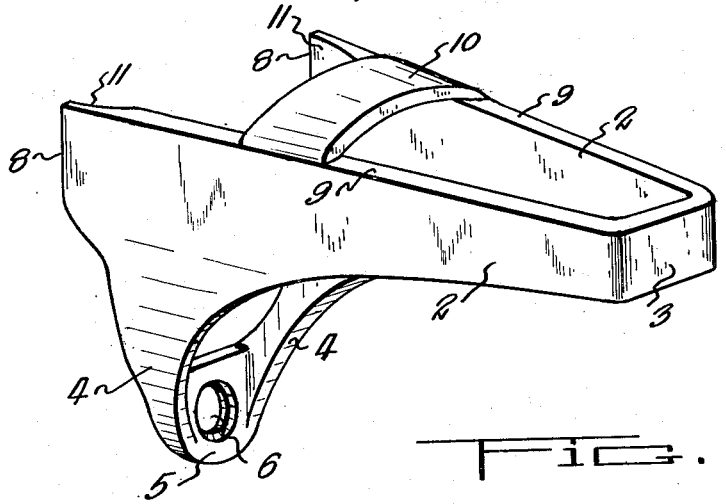
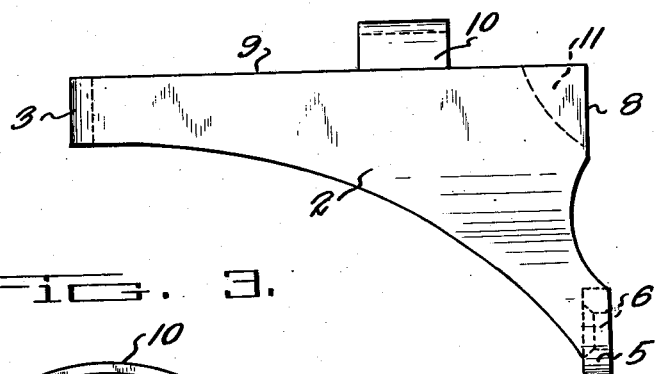
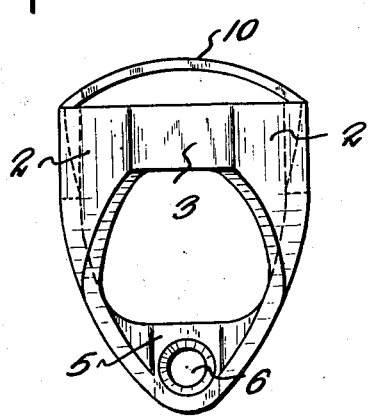
Inventor
SIDNEY L. ALTON
By
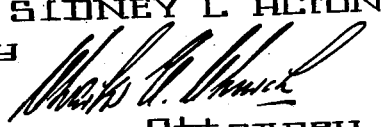
Attorney Nov. 4, 1952

S. L. ALTON 2,616,665

JACK ENGAGING HUB BRACKET FOR DETACHABLE
AUTOMOBILE DISK WHEELS

Filed July 7, 1950

Inventor
SIDNEY L. ALTON
By
Attorney

Patented Nov. 4, 1952

2,616,665

UNITED STATES PATENT OFFICE 2,616,665

JACK ENGAGING HUB BRACKET FOR DETACHABLE AUTOMOBILE DISK WHEELS

Sidney Leonard Alton, Waterdown, Ontario, Canada

Application July 7, 1950, Serial No. 172,479

2 Claims. (Cl. 254—133)

My invention relates to a jack engaging hub bracket for detachable automobile disc wheels, and the object of the invention is to provide a bracket which may be readily attached to one of the studs of an automobile road wheel hub and under which the jack may be positioned to readily raise the wheel from off the ground.

A further object of the invention is to so design the bracket that it may be attached to any standard road wheel assembly consisting of a disc wheel mounted upon a plurality of studs protruding from an axle hub.

Another and particular object of the invention is to so design the bracket that it may be readily used on any modern automobile hub and road wheel assembly.

With the foregoing and other objects in view as shall appear, my invention consists of a bracket all as hereinafter more particularly described and illustrated in the accompanying drawings in which:

Fig. 1 is a perspective view of the bracket.

Fig. 2 is a side elevational view of the bracket.

Fig. 3 is an end elevational view of the bracket, showing the outer end thereof.

Like characters of reference indicate corresponding parts in the different views of the drawings.

Figure 4:
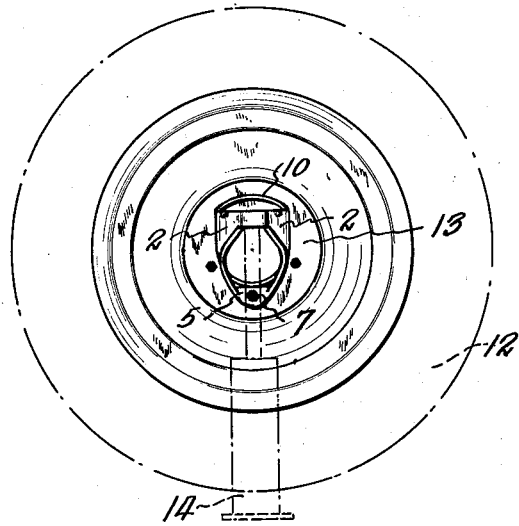
Fig. 4 is a side elevational view of an automobile road wheel and hub, and showing the bracket attached thereto and supported upon a jack.

My invention, while of a very practical nature, is of extremely simple construction and capable of ready attachment to a road wheel hub. The bracket is broadly of inverted L-shape and provided with an orifice in the lower portion of its vertical leg into which one of the lower hub studs may be inserted for supporting the bracket and retaining it in position. To raise the wheel a jack is positioned underneath the horizontal leg of the bracket, and when the upward pressure of the jack is applied, the bracket and wheel assembly are raised.

The bracket, as illustrated in the drawings, is formed of a V-shaped horizontal member having a pair of legs 2 each of substantially triangular shape, the outer ends of which are joined by a cross piece 3 to form the apex of the V.

The lower edges of the legs 2 of said member are gradually widened downwardly from the apex and turned inwardly at their widest points 4 to terminate in a V-shaped axle hub engaging end portion joined by a bridge piece 5 having an orifice 6 therein adapted to receive a lower stud 7 on the hub of the wheel and upon which the bracket is secured. As will be seen upon reference to Fig. 2, the bridge piece 6 protrudes beyond the vertical plane extending across the upper ends of the inner edges 8 of the legs 2 whereby the V-shaped axle hub engaging end portion has a three point contact with the hub.

Figure 6:
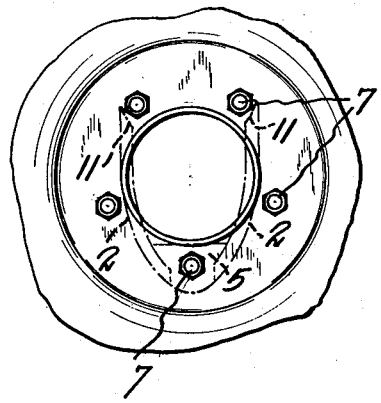
Fig. 6 is an enlarged side elevational view of the central portion of a wheel disc and hub and showing my bracket positioned thereon in dotted lines.

The upper edges 9 of the legs 2 of the V-shaped member are connected by a strengthening bridge piece 10 intermediately of their length and the upper inner corners of the legs 2 are formed with inner concave faces 11 in order to permit the bracket to straddle the upper studs of the hub, as illustrated in Fig. 6.

Figure 5:
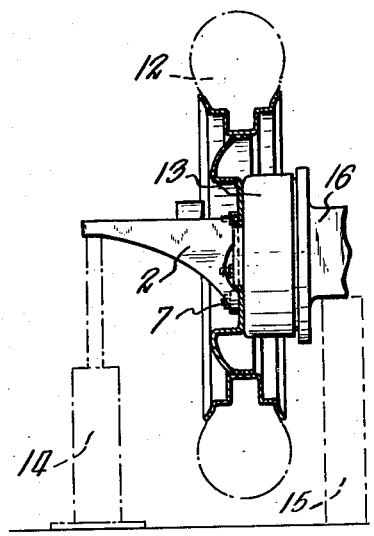
Fig. 5 is a central vertical cross-sectional view taken through the assembly shown in Fig. 4.

When it is desired to remove a wheel 12, the standard wheel hub cap is first removed to uncover the studs 7 by which the wheel is secured to the hub 13 and the nut is removed from the lower stud. The bracket is then applied as shown in Figs. 4 and 5 wherein the stud from which the nut has been removed is inserted in the orifice 6 in the bracket, after which the nut is threaded finger-tight upon the stud to bear against the bracket. A jack 14 is then positioned in place underneath the V-shaped horizontal member of the bracket adjacent the apex, whereby the raising of the jack will push the bracket upwardly. As the bracket is pushed upwardly it will, of course, raise the wheel from off the ground.

When the wheel is raised to a sufficient height a block 15 of suitable height is inserted underneath the axle housing or wheel support 16. The jack 14 is then contracted and lifted from underneath the bracket, and the bracket removed from the hub, thus leaving the wheel in a raised position whereby it may be readily removed.

To replace the wheel the operation is reversed, that is the bracket is again attached to the lower stud of the hub and the jack positioned in place and raised to permit the removal of the block 15. The jack is then contracted and removed, thus permitting the bracket to be taken off the hub and the stud nuts to be tightened up.

By the use of my bracket, a wheel may be readily removed from an automobile irrespective of the slope or condition of the ground upon which the wheels of the automobile rest, and there is no danger of the automobile slipping from off the jack when it is in the raised position.

It will be furthermore apparent that the bracket will enable an automobile driver to readily change a wheel without becoming dirty or soiled as the lifting operation is carried out at the outside of the wheel rather than at the bumper or underneath the axle; and while I have shown and described a particular embodiment of my invention, it is to be understood that I may make such changes and alterations as I may from time to time deem necessary, without departing from the spirit of my invention as set forth in the appended claims.

What I claim as my invention is:

1. A bracket for engagement by a jack to raise an automobile road wheel assembly having an axle hub and spaced circularly arranged studs, comprising a substantially V-shaped horizontal member with the upper edges of the legs disposed in a single plane, a reinforcing bridge connecting said edges, the lower edges of the legs of said member being adapted to be engaged by the jack adjacent the apex, said lower edges of the legs of said member being gradually widened downwardly from the apex and turned inwardly at their widest points to terminate in a V-shaped axle hub engaging end portion, and a vertical integral bridge piece in the base of the V-shaped hub engaging end portion having a stud receiving orifice therein for the lower most of the circularly arranged studs.

2. A bracket for engagement by a jack to raise an automobile road wheel assembly having an axle hub and spaced circularly arranged studs, comprising a substantially V-shaped horizontal member with the upper edges of the legs disposed in a single plane, a reinforcing bridge connecting said edges, the lower edges of the legs of said member being adapted to be engaged by the jack adjacent the apex, said lower edges of the legs of said member being gradually widened downwardly from the apex and turned inwardly at their widest points to terminate in a V-shaped axle hub engaging end portion, a vertical integral bridge piece in the base of the V-shaped hub engaging end portion having a stud receiving orifice therein for the lower most of the circularly arranged studs, and said bridge piece positioned in a vertical plane protruding beyond the V-shaped axle hub engaging portion so the member has a three point contact therewith.

SIDNEY LEONARD ALTON.

REFERENCES CITED

The following references are of record in the file of this patent:

UNITED STATES PATENTS

| Number | Name | Date |
|---|---|---|
| 2,462,418 | Peglow | Feb. 22, 1949 |